(12) United States Patent
May et al.

(10) Patent No.: US 7,338,995 B2
(45) Date of Patent: Mar. 4, 2008

(54) TITANIUM DIOXIDE—CONTAINING POLYMERS AND FILMS WITH REDUCED MELT FRACTURE

(75) Inventors: Donald Douglas May, Chadds Ford, PA (US); Bernd Zimmermann, Cologne (DE)

(73) Assignee: E.I. du Pont de Nemours and Company, Wilmington, DE (US)

( * ) Notice: Subject to any disclaimer, the term of this patent is extended or adjusted under 35 U.S.C. 154(b) by 453 days.

(21) Appl. No.: 10/794,432

(22) Filed: Mar. 6, 2004

(65) Prior Publication Data

US 2005/0197428 A1    Sep. 8, 2005

(51) Int. Cl.
    *C08K 9/06*    (2006.01)
(52) U.S. Cl. .................. 524/205; 523/212; 524/261
(58) Field of Classification Search ................ 524/497, 524/700
    See application file for complete search history.

(56) References Cited

U.S. PATENT DOCUMENTS

| | | | |
|---|---|---|---|
| 3,728,143 A * | 4/1973 | Pollard ..................... 106/452 |
| 4,083,946 A | 4/1978 | Schurr et al. |
| 4,375,989 A | 3/1983 | Makinen |
| 4,711,673 A * | 12/1987 | Musselman et al. ... 106/287.17 |
| 4,863,800 A | 9/1989 | Miyoshi et al. |
| 5,321,059 A | 6/1994 | Honda et al. |
| 5,607,994 A * | 3/1997 | Tooley et al. ............... 524/265 |
| 5,631,310 A * | 5/1997 | Tooley et al. ............... 523/212 |
| 5,789,466 A * | 8/1998 | Birmingham et al. ....... 523/213 |
| 5,827,906 A | 10/1998 | Metzemacher et al. |
| 5,889,090 A | 3/1999 | Tooley et al. |
| 6,277,919 B1 | 8/2001 | Dillon et al. |
| 6,455,158 B1 * | 9/2002 | Mei et al. ................... 428/403 |
| 6,572,974 B1 | 6/2003 | Biscotte et al. |
| 6,593,400 B1 | 7/2003 | Drummond |
| 6,596,071 B2 * | 7/2003 | Hayashi et al. ............. 106/445 |
| 6,599,982 B2 * | 7/2003 | Oriani ........................ 525/191 |
| 6,825,265 B2 * | 11/2004 | Daga et al. ................. 524/544 |
| 6,894,089 B2 * | 5/2005 | Mei et al. ................... 523/212 |
| 2005/0135994 A1 * | 6/2005 | Frerichs et al. ............. 423/610 |
| 2006/0110317 A1 * | 5/2006 | Torardi ....................... 423/610 |
| 2006/0110318 A1 * | 5/2006 | Torardi ....................... 423/610 |

FOREIGN PATENT DOCUMENTS

| | | |
|---|---|---|
| EP | 1204701 B1 | 9/2005 |
| JP | 03 166014 B2 | 5/2001 |
| JP | 3166014 B2 | 5/2005 |
| WO | WO97/07879 | 3/1997 |
| WO | WO 02/055596 A1 | 7/2002 |

OTHER PUBLICATIONS

Duchesne et. al., New Appraoches to the Processing of Rutile-Filled Polyolefins, Polymer Engineering and Science, vol. 30 (16) 950-956, 1990.
European Patent Office Search Report in Application No. 050054297.
Vitron Free Flow 2 Advertisement, need date.
S. R. Oriani and G. R. Chapman, DuPont Dow Elastomers L.L.C., "Fundamentals of Melt Fracture Elimination Using Fluoropolymer Process Aids" ANTEC 2003, pp. 22-28.
U.S. Appl. No. 60/875,136, Berrettini et al.
U.S. Appl. No. 60/643,980, May.
U.S. Appl. No. 60/862,533, May.
Vitron Free Flow 2 Advertisement, 2002, need date.

* cited by examiner

*Primary Examiner*—Katarzyna Wyrozebski

(57) ABSTRACT

Pigmented polymer compositions and processes for preparing melt-processible polymer compositions contain a melt-processible polymer, surface treated organic pigment, typically titanium dioxide, and a polymer processing aid are described. The pigment is surface treated by contact with a silicon-containing compound, such as octyltriethoxysilane followed by contact with an organic compound such as isostearic acid or ethoxylated silicone. The pigmented polymer composition containing a polymer processing aid facilitates production of shaped articles with low melt fracture.

18 Claims, No Drawings

TITANIUM DIOXIDE—CONTAINING POLYMERS AND FILMS WITH REDUCED MELT FRACTURE

BACKGROUND OF THE INVENTION

1. Field of the Invention

The present invention relates to surface treated inorganic pigment, a process for its preparation and its use in polymer compositions. More particularly this invention relates to polymer compositions containing the surface treated inorganic pigment and a polymer processing aid.

2. Description of the Related Art

The melt extrusion of polymers, for example, hydrocarbon polymers and polyamides, into shaped structures such as tubing, pipe, wire coating or film is accomplished by well-known procedures wherein a rotating screw pushes a viscous polymer melt through an extruder barrel into a die in which the polymer is shaped to the desired form, and is then subsequently cooled and solidified into a product, that is, the extrudate, having the general shape of the die. In film blowing processes, as an extruded plastic tube emerges from the die the tube is continuously inflated by air, cooled, collapsed by rolls and wound up on subsequent rolls.

Melt fracture is a flow phenomenon that occurs as the molten polymer flows through the die, starting at the die entry, evidenced by gross irregularities in the shape or surface of the extrudate. Melt fracture is considered to be the result of non-uniform or irregular elastic strains in the material at the die entrance. The shear rate at the surface of the polymer is sufficiently high that the surface of the polymer begins to fracture. That is, there is a slippage of the surface of the extruded polymer relative to the body of the polymer melt. The surface generally cannot flow fast enough to keep up with the body of the extrudate and a fracture in the melt occurs. These irregularities in the shape or surface of the extrudate are undesirable. For example, the irregularities produce an unattractive pattern on blown films. Processing aids are typically added to the polymer so that during melt processing they will migrate to the surface of the polymer lubricating the polymer and die surfaces thereby allowing high throughput with reduced melt fracture.

U.S. Pat. No. 6,593,400 discloses film forming polyolefin compositions containing antiblocking agents and polymer processing aids which exhibit reduced melt fracture. The '400 patent teaches that processing aids are adversely affected by antiblocking agents because the antiblock agent adsorbs the processing aid. The '400 patent describes an antiblock agent produced by surface treating an inorganic mineral with a functionalized siloxane polymer or a polyether polymer or functionalized polyether polymer or carbon based polymer. The carbon based polymers include maleic acid/olefin copolymers; maleic acid/styrene copolymers, mineral oils and paraffin waxes. The '400 patent teaches that such surface treated inorganic minerals used as an antiblock agent in the production of polyolefin film reduce the adsorption of processing aids which reduces melt fracture. The described inorganic mineral is selected from the group consisting of talc, calcium carbonate, precipitated calcium carbonate, clay and silica.

It is well known that antiblocking agents work by migrating to the surface of the polyolefin during melt processing to roughen the surface so that layers of the finished plastic film will not stick together. Both the antiblocking agent and the processing aid work at the surface of the polyolefin film.

Titanium dioxide pigments are added to polymers for imparting whiteness and/or opacity to the finished article. Unlike antiblocking agents and processing aids which are selected for their ability to migrate to the polymer surface, titanium dioxide pigments have not been known to show any preference for surface migration. A desirable shiny polymer surface occurs because the titanium dioxide does not have a tendency to break through the polymer surface in the typical manner of antiblock particles. Titanium dioxide pigments which have a specific gravity of about 4.3 g/cc typically become uniformly dispersed throughout the polymer.

Duchesne, et al., in *Polymer Engineering and Science* (1990), 30(16), 950-6, disclose the performance of a fluorocarbon elastomer processing additive in rutile-filled linear low density polyethylene compounds. Lower apparent melt viscosities and higher shear rates for the onset of melt fracture were reported for certain surface-treated rutiles. Duchesne at al. further describe a negative interaction between rutile titanium dioxide and polymer processing aids in linear low density polyethylene and propose minimizing the negative interaction by using separate masterbatches to shorten the extent and time of contact between pigment and processing aid which contact is considered to promote adsorption of the polymer processing aid onto the pigment which inhibits the function of the processing aid.

There is a significant disadvantage to using separate masterbatches. Separate masterbatches increase the cost of polymer production by adding to raw materials manufacturing, shipping and storing costs.

The present invention solves the problem of melt fracture resulting from the negative interaction between the processing aid and the inorganic pigment and permits the use of a combined pigment processing aid masterbatch. In particular, a shaped article of reduced melt fracture can now be made from a masterbatch containing both the inorganic pigment and the processing aid, and other additives, without concern for the negative interaction between the pigment and the processing aid which has been known to lead to melt fracture and other problems, such as die lip buildup.

SUMMARY OF THE INVENTION

In the process of this invention, a surface treated inorganic pigment together with a polymer processing aid improves the effectiveness of the polymer processing aid in reducing melt fracture in polymer shaped articles. The present invention provides additional advantages in preparing pigmented shaped articles which include reduced die lip build-up and reduced torque demand. Still further, the present invention permits the polymer processor to prepare a single polymer masterbatch, containing both pigment and polymer processing aid, which can be let down into a polymer to form a polymer which can be used to form shaped articles with reduced melt fracture.

In one embodiment, the invention relates to a process for surface treating titanium dioxide pigment to form a titanium dioxide pigment capable of being dispersed into a polymer melt containing a polymer processing aid comprising contacting a titanium dioxide pigment with (i) a first surface treating amount of a silicon-containing compound selected from the group consisting of a silane monomer, a silicone having a reactive site, and mixture thereof to form a titanium dioxide pigment having a silicon-containing surface treatment; and contacting the surface-treated titanium dioxide with (ii) a second surface treating amount of an organic compound selected from the group consisting of a carboxylic acid, a hydrocarbon wax, a silicone, which is different from the silicone of (i), and mixture thereof to form a titanium dioxide pigment having a surface treatment of the silicon-containing compound and the organic compound which is dispersible throughout the polymer melt and promotes migration of the processing aid to a surface of the polymer melt.

In another embodiment, the invention relates to a surface treated titanium dioxide pigment capable of being combined with a polymer processing aid and dispersed into a polymer melt comprising a titanium dioxide pigment having (i) a first surface coating derived from a silicon-containing compound selected from the group consisting of a silane monomer, a silicone polymer having a reactive site, and mixture thereof and (ii) a second surface coating derived from an organic compound selected from the group consisting of a hydrocarbon wax, a carboxylic acid, a silicone polymer which is different from the silicone polymer of (i) and mixture thereof which surface treated titanium dioxide pigment is dispersible throughout the polymer melt and promotes migration of the processing aid to a surface of the polymer melt.

In yet another embodiment, the invention relates to a process for producing a pigmented polymer composition capable of melt processing having reduced melt fracture comprising:

surface treating an inorganic pigment by
contacting the inorganic pigment with (i) a first surface treating amount of a silicon-containing compound selected from the group consisting of a silane monomer, a silicone polymer having a reactive site, and mixture thereof; and (ii) a second surface treating amount of an organic compound selected from the group consisting of a carboxylic acid, a hydrocarbon wax, a silicone, which is different from the silicone of (i) and mixture thereof;

combining the surface treated inorganic pigment with a fluoropolymer processing aid and a melt processible polymer to form a pigmented melt processible polymer composition in which the surface treated inorganic pigment is dispersed throughout the polymer composition and promotes migration of the processing aid to a surface of the polymer composition.

Pigmented melt processible polymer compositions produced according to the process of this invention can be employed in the manufacture of shaped articles.

DETAILED DESCRIPTION OF THE INVENTION

The invention relates to a process for surface treating an inorganic pigment, typically titanium dioxide pigment, to form a pigment capable of being dispersed into a polymer melt containing a polymer processing aid. The surface treated titanium dioxide pigment promotes migration of the processing aid to a surface of the polymer melt where the processing aid can enhance polymer melt processing.

Pigment Composition

It is contemplated that any inorganic pigment capable of being uniformly dispersed throughout a polymer melt and imparting color and opacity to the polymer melt will benefit from the surface treatment of this invention. Pigments with a specific gravity in the range of about 3.5 to about 6 g/cc can be used. Examples include without limit titanium dioxide, zinc oxide, zinc sulfide and barium sulfate. In particular, titanium dioxide is an especially useful pigment in the processes and products of this invention.

Titanium dioxide ($TiO_2$) pigment useful in the present invention may be in the rutile or anatase crystalline form. It is commonly made by either a chloride process or a sulfate process. In the chloride process, $TiCl_4$ is oxidized to $TiO_2$ particles. In the sulfate process, sulfuric acid and ore containing titanium are dissolved, and the resulting solution goes through a series of steps to yield $TiO_2$. Both the sulfate and chloride processes are described in greater detail in "The Pigment Handbook", Vol. 1, 2nd Ed., John Wiley & Sons, NY (1988), the teachings of which are incorporated herein by reference.

By "pigment" it is meant that the titanium dioxide particles have an average size of less than 1 micron. Preferably, the particles have an average size of from 0.020 to 0.95 microns, more preferably, 0.050 to 0.75 microns and most preferably 0.075 to 0.50 microns.

The titanium dioxide pigment may be substantially pure titanium dioxide or may contain other metal oxides, such as silica, alumina, zirconia. Other metal oxides may become incorporated into the pigment particles for example, by co-oxidizing or co-precipitating titanium compounds with other metal compounds. If co-oxidized or co-precipitated metals are present, they are preferably present in an amount 0.1 to 20 wt %, as the metal oxide, preferably, 0.5 to 5 wt %, more preferably 0.5 to 1.5 wt % based on the total pigment weight.

The titanium dioxide pigment may also bear one or more metal oxide surface coatings. These coatings may be applied using techniques known by those skilled in the art. Examples of metal oxide coatings include silica, alumina, zirconia among others. Such coatings may be present in an amount of 0.1 to 10 wt %, based on the total weight of the pigment, preferably 0.5 to 3 wt %.

The titanium dioxide pigment is surface treated. By "surface treated" it is meant titanium dioxide pigment particles that have been contacted with the compounds described herein wherein the compounds are adsorbed on the surface of the titanium dioxide particle or, a reaction product of at least one of the compounds with the titanium dioxide particle is present on the surface as an adsorbed species or chemically bonded to the surface. The compounds or their reaction products or combination thereof may be present as a coating, either single layer or double layer, continuous or non-continuous, on the surface of the pigment. Typically, a continuous coating comprising the silicon-containing compound and the organic compound is on the surface of the pigment.

In the present invention, the pigment is surface treated with (1) a silicon-containing compound and (2) an organic compound.

The silicon-containing compound is selected from the group consisting of a silane monomer, a silicone having a reactive site, and mixture thereof.

Suitable silane monomers are those in which at least one substituent group of the silane contains an organic substituent. The organic substituent can contain heteroatoms such as oxygen or halogen. Typical examples of suitable silanes include, without limit, alkoxy silanes and halosilanes having the general formula $R^1_x Si(R^2)_{4-x}$, wherein $R^1$ is a nonhydrolyzable group and $R^2$ is a hydrolyzable group and x=1 to 3. The nonhydrolyzable group will not react with water to form a different group. The hydrolysable group will react with water to form one or more different groups, which become adsorbed or chemically bonded to the surface of the titanium dioxide particle. Typically, $R^1$ is an alkyl, cycloalkyl or aromatic group having at least 1 to about 20 carbon atoms; preferably $R^1$ is an alkyl group having 8 to 18 carbon atoms. Typically, $R^2$ is an alkoxy group having about 1 to about 4 carbon atoms, preferably, ethoxy or methoxy; a halogen, such as chloro or bromo; or acetoxy or hydroxy or mixture thereof. Preferably $R^2$ is chloro, methoxy, ethoxy, hydroxy, or mixture thereof.

For example, silanes useful in carrying out the invention include octyltriethoxysilane, nonyltriethoxysilane, decyltriethoxysilane, dodecyltriethoxysilane, tridecyltriethoxysilane, tetradecyltriethoxysilane, pentadecyltriethoxysilane, hexadecyltriethoxysilane, heptadecyltriethoxysilane, octadecyltriethoxysilane, methyl triethoxysilane, dimethyl diethoxy silane and triethoxypropyl silane. More typically, the silane is octyltriethoxysilane or octadecyltriethoxysilane, most typically, the silane octyltriethoxysilane. Examples of halosilanes that may be useful include chlorosilane and chloromethylsilane. Additional examples of potentially useful silanes include 2-ethyl-2-methyldisilane, 1-ethoxy-2-silyltrisilane, 2-methyldisilanecarboxylic acid, benzylsilanediol, bromosilane, (trimethylsilyl)cyclohexane, cyclopentasilane, and silacyclohexane.

A silicone having a reactive site can also be useful as the silicon-containing compound for the first surface treatment. Typically, a silicon-hydrogen bond forms the reactive site of the silicone polymer. Hydridosiloxanes are typical examples of useful silicones having a silicon-hydrogen reactive site. Such hydridosiloxanes include alkylhydridosiloxanes in which the alkyl group contains from 1 to about 20 carbon atoms. Specifically methylhydridosiloxanes can be useful such as those having the formula $Me_3SiO[SiOMeH]_n$—$[SiOMe_2]_m$-$SiMe_3$, where n is an integer ranging from 1 to about 200, m is an integer ranging from 0 to about 200 and Me is methyl. Typically, n is an integer ranging from about 30 to about 70 and m is 0. Other potentially useful silicone compounds having a reactive site are the hydridosilsesquioxanes described in U.S. Pat. No. 6,572,974.

The surface-treated pigment resulting from contacting the pigment with the silicon-containing compound is then contacted with a second surface treating amount of an organic compound selected from the group consisting of a hydrocarbon wax, a carboxylic acid and a silicone polymer and mixture thereof to form a pigment having a silicon-containing surface treatment and an organic surface treatment. The surface treated pigment is dispersible throughout the polymer melt and promotes migration of the processing aid to a surface of the polymer melt.

Any known hydrocarbon wax material can be useful as the second surface treating compound. The wax can be solid or liquid at room temperature. Examples of suitable waxes include petroleum wax such as paraffin wax and micro crystalline wax; plant wax such as candelilla wax and carnauba wax; animal wax such as bees wax and lanolin; synthetic hydrocarbon wax, such a Fischer-Tropsch wax and polyethylene wax.

The hydrocarbon wax can be a wax-like material including, without limit, a high molecular weight alcohol, such as stearyl alcohol and 12-hydroxystearic acid; or a high molecular weight carboxylic acid. The wax or wax-like material can be used alone or in mixture with one or more other waxes or wax-like materials.

A high molecular weight carboxylic acid is typically employed as the second surface treating compound. The high molecular weight carboxylic acid typically contains up to about 30 carbon atoms, typically from about 8 to about 30 carbon atoms, more typically from about 10 to about 20 carbon atoms. The carboxylic acid can be saturated or unsaturated, straight chain, branched chain or cyclic and can include one or more carboxyl groups (COOH). Preferably, the carboxylic acid has two or more carboxyl groups. Mixtures of carboxylic acids are contemplated as within the scope of this invention. Examples of useful high molecular weight carboxylic acids include, without limit, lauric acid, stearic acid, isostearic, oleic acid, linoleic acid and mixture thereof.

Low molecular weight carboxylic acids are also contemplated and can be used alone or in combination with the high molecular weight carboxylic acid and/or the hydrocarbon wax. Typically low molecular weight carboxylic acids contemplated can contain up to about 8 carbon atoms, more typically from 1 to about 8 carbon atoms, even more typically, from about 2 to about 6 carbon atoms. The low molecular weight carboxylic acid can be saturated or unsaturated, straight chain, branched chain or cyclic and can include one or more carboxyl groups (COOH). Preferably, the carboxylic acid has two or more carboxyl groups. Mixtures of carboxylic acids are contemplated as within the scope of this invention. Typical examples of the low molecular weight carboxylic acid include, without limit, malonic acid, fumaric acid, maleic acid, benzoic acid, phthalic acid, and mixture thereof.

The high molecular weight carboxylic acids are most useful. A specific example of a useful high molecular weight carboxylic acid is isostearic acid.

The second surface treatment can also be accomplished by using a silicone polymer or mixture thereof. A typical silicone contemplated is represented by the formula

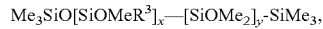
$Me_3SiO[SiOMeR^3]_x$—$[SiOMe_2]_y$-$SiMe_3$, where x and y are independently integers from 0 to 200, typically up to 100 even more typically up to 50, and $R^3$ is a saturated or unsaturated linear or branched unsubstituted or heteroatom-substituted hydrocarbon containing 1 to about 20 carbon atoms, typically 1 to about 8 carbon atoms. A typical heteroatom is oxygen. Typically $R^3$ is an alkoxy group having the structure

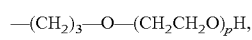
—$(CH_2)_3$—O—$(CH_2CH_2O)_p$H, where p is an integer of 1 to about 25. Typically the number average molecular weight ($M_n$) of the silicone ranges from about 1,000 to about 10,000, most typically from about 4,000 to about 5,000. The amounts of each of the first silicon-containing compound and the second organic compound used to surface treat the pigment particles generally range from about 0.01 to about 6 wt %, based on the total weight of the pigment, preferably about 0.1 to about 3 wt %, more preferably about 0.5 to about 1.5 wt %, and most preferably, 1 wt %.

The process of surface treating pigment particles with the first and second compounds is not especially critical and may be accomplished in a number of ways. While typically the pigment is treated with the first organic compound then the second in sequence, the pigment may be treated with the first and second organic compounds simultaneously. The goal of the surface treatment with both compounds is to completely cover the surface of the pigment particles and/or agglomerates to cover-up any sites onto which the polymer processing aid can bond because a negative interaction between the pigment, especially titanium dioxide pigment, and the polymer processing aid was found without both surface treatments and is considered to result from untreated surface areas on the pigment particles. With only the first surface treatment, even when using an excess amount, a negative interaction between pigment and processing aid was found indicating inadequate ability of the first surface treatment to sufficiently cover the surface and prevent the negative interaction.

The process of surface treating the pigment may be performed by contacting dry pigment with neat compound. When a silane or silicone is employed the compound may be prehydrolzyed, then contacted with dry pigment. Alternatively, the treating compound may be dissolved in a solvent or prepared as a slurry before contacting pigment, in dry or slurry form. In addition, the pigment may be immersed in the treating compound, if liquid, or a solution, of the treating compound is used. Other methods of contact include spraying the pigment with the treating compound or a solution of the treating compound; injecting the treating compound or a solution of the compound into an air or steam stream pigment fluid energy mill. It should be recognized that these methods are provided for guidance only, and not intended as a limitation.

The amount of pigment present in the pigmented polymer composition and shaped polymer article will vary depending on the end use application. However, typically, the amount of pigment in the polymer composition ranges from about 30 to about 90 wt %, based on the total weight of the composition, preferably, about 50 to about 80 wt %. The amount of pigment in an end use, such as a shaped article, for example, a polymer film, can range from about 0.01 to about 20 wt %, and is preferably from about 0.1 to about 15 wt %, more preferably 5 to 10 wt %.

Inorganic pigments treated in accordance with this invention are capable of being dispersed throughout the polymer melt. Typically the treated inorganic pigment can be uniformly dispersed throughout the polymer melt. Such pigments may exhibit some minor degree of clumping together within the polymer. A minor amount of the pigment particles may also migrate to the surface of the polymer melt but any such migration would not be to a degree sufficient for the pigment to qualify as a surface active material such as an antiblock agent.

The present invention is directed to a process for improving the melt-processibility of melt-processible polymer compositions, which contain polymer processing aids and pigments. The invention further provides a process for improving the extrusion processibility of melt processible polymer compositions. As used herein, the term "extrusion processibility" refers to the conditioning time (i.e., the elapsed time after extruder start up in which extruded, shaped, articles exhibit a high degree of melt fracture) before obtaining an extrudate, shaped article, having a smooth surface, free of melt fracture. To minimize waste and reduce costs, a very short conditioning time is desirable.

The surface treated inorganic pigment is considered to promote migration of the processing aid to a surface of the polymer melt in the sense that without the surface treatment the processing aid would tend to adhere to the pigment particles, especially titanium dioxide pigment, which prevents the processing aid from migrating to the surface of the polymer melt. With the surface treatment of this invention the polymer processing aid does not adhere to the surface of the pigment particles and thus is able to migrate to the surface of the polymer melt to facilitate melt processing.

In one embodiment, the invention relates to a polymer composition which can be used as a masterbatch. When used as a masterbatch, the polymer can provide both opacity and viscosity attributes to a polymer blend that can be utilized to form shaped articles.

Polymers

Polymers useful in this invention are polymers suitable for making a shaped article by melt processing. By "melt-processible," it is meant a polymer that can be extruded or otherwise converted into shaped articles through a stage which involves obtaining the polymer in a molten state.

Polymers which are suitable for use in this invention include, by way of example but not limited thereto, polymers of ethylenically unsaturated monomers including olefins such as polyethylene, polypropylene, polybutylene, and copolymers of ethylene with higher olefins such as alpha olefins containing 4 to 10 carbon atoms or vinyl acetate; vinyls such as polyvinyl chloride, polyvinyl esters such as polyvinyl acetate, polystyrene, acrylic homopolymers and copolymers; phenolic resins; alkyd resins; amino resins; epoxy resins, polyamides, polyurethanes; phenoxy resins, polysulfones; polycarbonates; polyesters and chlorinated polyesters; polyethers; acetal resins; polyimides; and polyoxyethylenes. Mixtures of polymers are also contemplated as the first or second polymer or both.

Polymers suitable for use in the present invention also include various rubbers and/or elastomers, either natural or synthetic polymers based on copolymerization, grafting, or physical blending of various diene monomers with the above-mentioned polymers, all as generally known in the art.

Thus, in general, polymers suitable for use in the processes of this invention include plastic and elastomeric polymers. Preferably, the polymer is selected from the group consisting of polyolefin, polyvinyl chloride, polyamide and polyester, and mixture of these. More preferred are polyolefins. Most preferred are polyolefins selected from the group consisting of polyethylene, polypropylene, and mixture thereof. A typical polyethylene polymer is low density polyethylene and linear low density polyethylene. Any of the metallocene catalyzed polymers are useful in this invention.

In one embodiment of this invention a first melt processible polymer containing the pigment and the processing aid, which is referred to as a "masterbatch" is prepared by melt blending the polymer, pigment and processing aid. Any polymer which is suitable for melt processing with a high concentration of inorganic pigment is suitable for the polymer of the masterbatch.

The masterbatch is then melt blended with a second melt processible polymer referred to as a "let down" polymer. Any polymer suitable for the desired end-use can be used as the let down polymer.

The first and second polymers can be the same or different. Typically, the first and second polymers are highly compatible. The second polymer is usually free of pigment and processing aid but can contain one or more other additives (such as an antiblock agent or antioxidant) which can be added by melt blending from a masterbatch containing the polymer and such other additive.

While the amount of first polymer can vary depending on the polymer or mixture of polymers employed, the first polymer is typically present in an amount of from about 10 to about 60 wt. %, typically about 20 to about 50 wt %, even more typically about 30 to about 40 wt. %. based on the total weight of the first and second polymers.

Polymer Processing Aid

Polymer processing aids are added in various melt-processing procedures such as extrusion, injection molding, and blow molding to ease processing-related problems due to inherent viscoelastic properties of the polymer being melt-processed. For purposes of this invention, polymer processing aids comprise fluoropolymers, including elastomeric fluoropolymers (i.e., fluoroelastomers or amorphous fluoropolymers) and thermoplastic fluoropolymers (i.e., semi-crystalline fluoropolymers). Fluoroelastomers useful in the process of this invention are fluoropolymers that are normally in the fluid state at room temperature and above, i.e., fluoropolymers which have glass transition ($T_g$) values below room temperature (e.g., 25° C.) and which exhibit little or no crystallinity at room temperature.

It is preferred, but not essential, to employ fluoroelastomers having a fluorine to hydrogen ratio of at least 1:1.5.

Fluoropolymers of this invention are formed from fluorinated monomers which may be polymerized or copolymerized to yield suitable fluoroelastomers include vinylidene fluoride, hexafluoropropylene, chlorotrifluoroethylene, tetrafluoroethylene and perfluoroalkyl perfluorovinyl ethers. Specific examples of fluoroelastomers include copolymers of vinylidene fluoride and a comonomer selected from hexafluoropropylene, chlorotrifluoroethylene, 1-hydropentafluoropropylene, and 2-hydropentafluoropropylene; copolymers of vinylidene fluoride, tetrafluoroethylene, and hexafluoropropylene or 1- or 2-hydropentafluoropropylene; and copolymers of tetrafluoroethylene, propylene and, optionally, vinylidene fluoride, all of which are known in the art.

Thermoplastic (semi-crystalline) fluoropolymers which may be used in the process of this invention include, but are not limited to, poly(vinylidene fluoride), homopolymers and copolymers of tetrafluoroethylene (such as Teflon® FEP fluorocarbon resin), and copolymers of tetrafluoroethylene and hexafluoropropylene, optionally with vinylidene fluoride.

Preferably, the fluoropolymer is derived from one or more fluorinated monomers, selected from the group consisting of vinylidene fluoride, hexafluoropropylene, chlorotrifluoroethylene, tetrafluoroethylene and perfluoroalkyl perfluorovinyl ethers.

The processing aid may also contain one or more non-fluorinated monomeric or polymeric components including, without limit, caprolactone and polyester polyol.

Multimodal fluoropolymers, such as those disclosed in U.S. Pat. No. 6,277,919 may also be employed as the fluoropolymer in the compositions of this invention. By "multimodal" is meant that the fluoropolymer has at least two components of discrete and different molecular weights. A first component, "A", has a lower molecular weight and a relatively high melt flow index ($MFI_A$). A second component, "B", has a higher molecular weight and a relatively low melt flow index ($MFI_B$). Preferably, the multimodal fluoropolymer contains two or three discrete molecular weight components.

The MFI values defining Component A and Component B depend on which melt processable polymer is used. $MFI_A$ is preferably greater than 50 and $MFI_B$ is preferably less than 50 if the melt processable polymer is a hydrocarbon polymer. $MFI_A$ is preferably greater than 1000 and $MFI_B$ is preferably less than 100 if the melt processable polymer is a nylon or polyester polymer.

The ratio of $MFI_A$ to $MFI_B$ is in the range of 2:1 to 100:1, preferably, 5:1 to 50:1. If third component is present, the ratio $MFI_A:MFI_B$ of at least one Component A to one Component B must be in the range of 2:1 to 100:1.

The weight ratio of Component A to Component B is 1:99 to 99:1, preferably 5:95 to 50:50, most preferably 10:90 to 45:65.

The components may be amorphous or semi-crystalline. The multimodal fluoropolymers are derived from at least one fluorinated monomer, preferably two or more, wherein the fluorinated monomers are the same as those listed hereinabove. Preferred fluorinated monomers are vinylidene fluoride, hexafluoropropylene and tetrafluoroethylene. Optionally, the multimodal fluoropolymers may be a copolymer derived from one or more fluorinated monomers and one or more non-fluorinated monomers of the formula $(R^4)_2C=C(R^4)_2$ wherein $R^4$ is selected from H, Cl, or an alkyl group of from 1 to 8, preferably 1 to 3 carbon atoms.

Other contemplated processing aids are described in U.S. Pat. No. 6,599,982.

Preferably the fluoropolymer processing aid has a particle size greater than 2 microns and less than 10 microns. Particle size is measured, for purposes of this preferred embodiment, at a point immediately preceding the die (i.e., at the die entrance) in a process for producing a shaped article by extrusion. Preferably, the weight average particle size of fluoropolymer processing aid is greater than 4 microns, and most preferably, greater than 6 microns, as measured just prior to the die.

The amount of polymer processing aid present in the pigmented polymer masterbatch and shaped polymer article will vary depending on the anticipated end use application. However, typically, the amount of processing aid in the polymer masterbatch is 0.01 to 5 wt %, based on the total weight of the masterbatch, preferably, 0.05 to 3 wt %. The amount of processing aid in the end use, such as a shaped article, for example a polymer film is 25 to 2000 parts per million (ppm), preferably 25 to 1000 ppm, based on the total weight of the shaped article.

The fluoropolymer is optionally used in combination with an interfacial agent, with a weight ratio of interfacial agent to fluoropolymer of no more than 5:1. Use of an interfacial agent is particularly advantageous when used in an effective amount to achieve a fluoropolymer particle size greater than 2 microns and less than 10 microns.

By "interfacial agent" is meant a thermoplastic polymer which is characterized by 1) being in the liquid state (or molten) at the extrusion temperature, 2) having a lower melt viscosity than both the non-fluorinated melt processible polymer and fluoropolymer process aid, and 3) freely wets the surface of the fluoropolymer particles in the extrudable composition. Examples of such interfacial agents include, but are not limited to i) silicone-polyether copolymers; ii) aliphatic polyesters such as poly(butylene adipate), poly (lactic acid) and polycaprolactone polyesters (preferably, the polyester is not a block copolymer of a dicarboxylic acid with a poly(oxyalkylene) polymer); iii) aromatic polyesters such as phthalic acid diisobutyl ester; iv) polyether polyols (preferably, not a polyalkylene oxide) such as poly(tetramethylene ether glycol); v) amine oxides such as octyldimethyl amine oxide; vi) carboxylic acids such as hydroxybutanedioic acid; vii) fatty acid esters such as sorbitan monolaurate and triglycerides; and vii) poly(oxyalkylene) polymers, which include poly(oxyalkylene) polyols, such as polyethylene glycols and their derivatives.

A preferred aliphatic polyester interfacial agent is a polycaprolactone having a number average molecular weight in the range 1000 to 32000, preferably 2000 to 10000, and most preferably 2000 to 4000.

The interfacial agent may be introduced to the mixture of fluoropolymer processing aid and melt processible polymer at any point up to and including the final process to produce a shaped article. It is most desirable to combine the processing aid and interfacial agent in the process to prepare the pigmented polymer composition where both ingredients are present at high concentration so that the wetting of the fluoropolymer surface in the mixture occurs quickly.

Other Additives

A wide variety of additives may be present in the polymer composition produced by the process of this invention as necessary, desirable or conventional. Such additives include catalysts, initiators, anti-oxidants (e.g., hindered phenol such as butylated hydroxytoluene), blowing agent, ultraviolet light stabilizers (e.g., hindered amine light stabilizers or "HALS"), organic pigments including tinctorial pigments, plasticizers, antiblocking agents (e.g. clay, talc, calcium carbonate, silica, silicone oil, and the like) leveling agents, flame retardants, anti-cratering additives, and the like.

Preparation of the Polymer Composition

The present invention provides a process for preparing a pigmented polymer composition. Typically, in this process, titanium dioxide is surface treated in accordance with this invention and combined with a polymer processing aid. This step can be performed by any means known to those skilled in the art. An advantage of this invention is that the polymer processing aid may be physically mixed with the pigment with or without another component in the mixture. In contrast to previous techniques in which contact of the pigment and the processing aid was avoided, especially prolonged contact, with this invention the pigment and the processing aid can be combined and stored together for later addition to the melt-processible let down polymer. Both dry mixing or wet mixing are suitable. In wet mixing, the pigment, processing aid or both may be slurried or dissolved in a solvent and subsequently mixed with the other ingredients. Preferably, due to ease and performance, the pigment and polymer processing aid are dry mixed.

In one embodiment of the invention, the pigment which has been surface treated in accordance with this invention, after contact with the polymer processing aid, and optionally, with an interfacial agent, is contacted with a first melt processible polymer. Any melt compounding techniques, known to those skilled in the art may be used. Generally, the pigment, processing aid, other additives and melt-processible polymer are brought together and then mixed in a blending operation, such as dry blending, that applies shear to the polymer melt to form the pigmented polymer. The melt-processible polymer is usually available in the form of powder, granules, pellets or cubes. Methods for dry blending include shaking in a bag or tumbling in a closed container. Other methods include blending using agitators or paddles. Pigment, polymer processing aid and melt-processible polymer may be co-fed using screw devices, which mix the pigment, polymer processing aid and melt-processible polymer together before the polymer reaches a molten state.

After mixing or blending, the pigmented polymer is melt blended, using any methods known in the art, including screw feeders, kneaders, high shear mixers, blending mixers, and the like. Typical methods use Banbury mixers, single and twin screw extruders, and hybrid continuous mixers.

Processing temperatures depend on the polymer and the blending method used and are well known to those skilled in the art. The intensity of mixing depends on the degree of softening.

The pigmented polymer composition produced by the process of this invention is useful in production of shaped articles. A shaped article is typically produced by melt blending the pigmented polymer which comprises a first melt-processible polymer, with a second melt-processible polymer to produce the polymer that can be used to form the finished article of manufacture. The pigmented composition and second polymer are melt blended, using any means known in the art, as disclosed hereinabove. In this process, twin screw extruders are commonly used. Co-rotating twin screw extruders are available from Werner and Pfleiderer. The melt blended polymer is extruded to form a shaped article.

In the production of shaped articles, use of the pigmented polymer of this invention reduces die lip build up on the exit slit of the extrusion die. In addition, there is reduced torque demand, enabling shaped articles to be made at lower pressure, reducing risk of polymer degradation. Shaped articles produced by the process of this invention exhibit reduced melt fracture, i.e., surface defects.

This invention is particularly suitable for producing shaped articles such as tubing, pipes, wire coatings, and films. The process is especially useful for producing films, especially blown films.

While this invention provides particular advantages for enhancing the performance of polymer processing aids when pigment is present in a shaped article, by reducing melt fracture, the performance of other polymer additives may also be enhanced. Such other additives include, but are not limited to light stabilizers, such as hindered amine light stabilizers and or heat stabilizers such as phosphites or phenolics.

In one embodiment, the invention herein can be construed as excluding any element or process step that does not materially affect the basic and novel characteristics of the composition or process. Additionally, the invention can be construed as excluding any element or process step not specified herein.

EXAMPLES

Melt Fracture Test Procedure

Prior to each test run, the extruder and die were purged with low density polyethylene ("LDPE") masterbatch containing 50% silica (diatomaceous earth) in polyethylene in order to remove the processing aid (typically, a fluoroelastomer) from the previous test. After purging the silica masterbatch from the extruder with linear low density polyethylene ("LLDPE"), blown film was produced using 100% LLDPE for 10 minutes to ensure that each test began with 100% melt fracture.

When the extrudable composition being tested was dropped into the feed throat of the extruder, a digital timer with a one second readout was started. The melt fracture removal performance of each extrudable composition was monitored by continuous visual observation of the roughness of the melt exiting the die and of the blown film by a trained operator. When no melt fracture was visible in this manner, the digital timer was stopped and a film sample taken for inspection to insure that all melt fracture had been eliminated. If the melt fracture was completely eliminated, the conditioning time was recorded as the time registering on the digital timer. When melt fracture was still present after 60 minutes of running time, a film sample was taken and the test terminated.

Example 1

50 pounds of rutile titanium dioxide pigment were surface treated with octyl triethoxysilane as described in U.S. Pat. No. 5,889,090. The surface treated pigment was again surface treated but with 1 wt % isostearic acid. This was accomplished by adding isostearic acid to dry pigment and blending with a V-cone blender fitted with a internal stirring bar (known as an intensifier bar). These blenders are commercially available through suppliers such as Patterson-Kelley. The pigment and isostearic acid were blended with an intensifier bar at ambient temperature for 15 minutes. The treated product was then dry blended 114 grams of Viton® Z-200 Freeflow (available from DuPont-Dow Elastomers), a fluoropolymer having a particle size greater than 2 microns and less than 10 microns. The treated pigment was then dispersed into NA206, a low density polyethylene with a melt index of 13.5 (available from Equistar) using a 30 mm twin screw extruder at 70 weight percent $TiO_2$. The final predispersed $TiO_2$ pigment is referred to as masterbatch. The masterbatch was let down to 5 wt % into polyethylene polymer, L10029 LLDPE, with a melt index of 2.0, available from Exxon-Mobil, to yield an extrudable white composition. Blown films 25 microns in thickness were produced using a 2.5 inch 24:1 L/D extruder equipped with a 4 inch blown film die having a 0.030 inch gap. Barrel zone temperatures (starting at the feed section) were 160° C., 180° C., 194° C., and 190° C. with adapter and die temperatures of 200° C. Melt temperature for each run was 212° to 214° C. and the die pressure at the start of each run was in the range of 27.7 to 28.3 MPa. The screw was a conventional design with a barrier flight, operating at 40 rpm. Extruder output at the start of each run was 45.4 kg/hr, resulting in apparent shear rates in the die gap of approximately 500 sec$^{-1}$.

Melt fracture was determined in accordance with the above-described test procedure and the results were reported in Table 1.

Example 2

The process described in Example 1 was repeated except that the $TiO_2$ pigment was treated with ethoxylated silicone oil commercially available from General Electric as SF-1288 instead of isostearic acid. Melt fracture was determined in accordance with the above-described test procedure and the results were reported in Table 1.

Comparative Example A

The procedure described in Example 1 was repeated except that the isostearic acid was omitted so the titanium dioxide was only treated with octyl triethoxysilane. After one hour of processing, there remains 17% melt fracture. The results of these tests are shown in Table 1.

TABLE 1

| Example | Time, minutes | % Melt Fracture remaining |
|---------|---------------|---------------------------|
| 1       | 45            | 0                         |
| 2       | 60            | 0                         |
| A       | >60           | 17                        |

As can be seen from Table 1, in Examples 1 and 2, polymer which contained titanium dioxide pigment that was treated in accordance with this invention, blended with a polymer processing aid and then added to a polyethylene polymer show melt fracture improvements over Comparative Example A wherein the titanium dioxide pigment was not surface treated with both a silicon-containing compound and an organic compound. Treatment with only organic compound was less effective.

Comparative Example B

The process described in Example 1 was repeated except that the $TiO_2$ pigment was not treated with either the silane or isostearic acid. Instead, the $TiO_2$ pigment was treated with 0.2% triethanolamine in a fluid energy mill. It was compounded as described previously at 50 wt % and let down in a single screw extruder attached to a blown film die as described in Example 1. After 1 hour processing, there was 100% melt fracture remaining, indicating the importance of surface treating the titanium dioxide with both silicon-containing compound and an organic compound for the processing aid to be effective.

Comparative Example C

The process of Example 1 was repeated except the pigment was treated with a 3 wt % alumina coating by adding sodium aluminate to a basic aqueous slurry of $TiO_2$, controlling pH, separating the pigment and washing to remove soluble salts. After 1 hour processing there remained 85% melt fracture indicating the importance of the surface treatments in this invention.

The description of illustrative and preferred embodiments of the present invention is not intended to limit the scope of the invention. Various modifications, alternative constructions and equivalents may be employed without departing from the true spirit and scope of the appended claims.

What is claimed is:

1. A process for producing a pigmented melt processible polymer composition, comprising:
   (1) surface treating an inorganic pigment comprising titanium dioxide by contacting the inorganic pigment with a first surface treating amount of
      (a) a silicon-containing compound selected from the group consisting of a silane monomer, a silicone polymer having a reactive site, and mixtures thereof; and
      (b) a second surface treating amount of an organic compound selected from the group consisting of a carboxylic acid, a hydrocarbon wax, a silicone polymer which is different from the silicone polymer of (a) above and mixtures thereof; to form surface treated inorganic pigment
   (2) mixing the surface treated inorganic pigment with
      (a) a processing aid comprising a polymer derived from one or more fluorinated monomers selected from the group consisting of vinylidene fluoride, hexafluoropropylene, chlorotrifluoroethylene, tetrafluoroethylene and perfluoroalkyl perfluorovinyl ethers, and
      (b) a first melt processible polymer selected from the group consisting of one or more polymers of ethylenically unsaturated olefins and copolymers of ethylene with higher olefins or vinyl acetate, polyvinyl chloride, polyvinyl esters and copolymers thereof, phenolic resins, alkyd resins, amino resins, epoxy resins, phenoxy resins, polysulfones, polycarbonates, polyesters and chlorinated polyesters, polyethers, acetal resins, polyimides and polyoxyethylenes and mixtures thereof;
   to form a pigmented melt processible polymer masterbatch, and the processing aid being in an amount ranging from 0.01 wt. % to 5 wt. %, based on the total weight of the masterbatch; and
   (3) melt blending the pigmented melt processible polymer masterbatch with a let down polymer comprising a second melt processible polymer selected from the group consisting of one or more polymers of ethylenically unsaturated olefins and copolymers of ethylene with higher olefins or vinyl acetate, polyvinyl chloride, polyvinyl esters and copolymers thereof, phenolic resins, alkyd resins, amino resins, epoxy resins, phenoxy resins, polysulfones, polycarbonates, polyesters and chlorinated polyesters, polyethers, acetal resins, polyimides and polyoxyethylenes and mixtures thereof, to form a third melt processible polymer which is a pigmented melt processible polymer composition.

2. The process of claim 1 wherein the silane monomer is an alkoxysilane or a halosilane or mixture thereof.

3. The process of claim 1 wherein the silane monomer is octyl triethoxysilane.

4. The process of claim 1 wherein the silicone polymer of (a) is methylhydridosiloxane having the formula

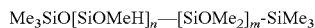

Me$_3$SiO[SiOMeH]$_n$—[SiOMe$_2$]$_m$-SiMe$_3$ wherein n and m are independently integers ranging from 1 to about 200 carbon atoms and Me is methyl.

5. The process of claim 1 wherein the silicone polymer of (b) is a silicone polymer represented by the formula

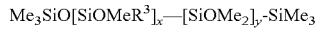

Me$_3$SiO[SiOMeR$^3$]$_x$—[SiOMe$_2$]$_y$-SiMe$_3$ where x and y are independently integers from 1 to about 200, and R$^3$ is either a saturated, unsaturated, linear or branched unsubstituted or heteroatom substituted hydrocarbon containing 1 to about 20 carbon atoms and Me is methyl.

6. The process of claim 5 wherein R$^3$ is a heteroatom-substituted hydrocarbon having the structure —(CH$_2$)$_3$—O—(CH$_2$CH$_2$O)$_p$H, where p is an integer ranging from 1 to about 25.

7. The process of claim 1 wherein the carboxylic acid is selected from the group consisting of lauric acid, stearic acid, isostearic acid, oleic acid, linoleic acid, and mixture thereof.

8. The process of claim 1 wherein the processing aid has a particle size greater than 2 microns and less than 10 microns.

9. The process of claim 1 wherein the processing aid further comprises an interfacial agent.

10. The process of claim 9 wherein the interfacial agent is polycaprolactone.

11. The process of claim 1 further comprising adding an antiblock agent to the third melt processible polymer.

12. The process of claim 1 further comprising forming the third melt processible polymer into a shaped article.

13. The process of claim 1 wherein the first or the second melt processible polymer or both is selected from the group consisting of low density polyethylene and linear low density polyethylene.

14. The process of claim 1 wherein the first or the second melt processible polymer or both is selected from the group consisting of polyethylene, polypropylene and polybutylene.

15. The process of claim 1 wherein the first a the second melt processible polymer or both is selected from the group consisting of polyvinyl acetate, polystyrene, acrylic homopolymer and acrylic copolymer.

16. The process of claim 1 wherein the surface treated inorganic pigment is in the masterbatch in an amount ranging from about 30 wt. % to about 90 wt. %, based on the total weight of the masterbatch.

17. The process of claim 1 wherein the surface treated inorganic pigment is in the masterbatch in an amount ranging from about 50 wt. % to about 80 wt. %, based on the total weight of the masterbatch.

18. The process of claim 1 wherein the processing aid is in an amount ranging from 0.05 wt. % to 3 wt. %, based on the total weight of the masterbatch.

* * * * *